United States Patent [19]

Goupy et al.

[11] 4,354,700
[45] Oct. 19, 1982

[54] BUMPER ATTACHMENT APPARATUS, IN PARTICULAR FOR AUTOMOBILES

[75] Inventors: Marcel Goupy, Saint Cloud; Pierre Roubinet, Ruell-Malmaison, both of France

[73] Assignee: Regie Nationale des Usines Renault, Boulogne-Billancourt, France

[21] Appl. No.: 116,580

[22] Filed: Jan. 29, 1980

[30] Foreign Application Priority Data

Feb. 6, 1979 [FR] France ............... 79 02973

[51] Int. Cl.³ ........................... B60R 19/00
[52] U.S. Cl. ..................... 293/132; 293/136; 293/155
[58] Field of Search ............... 293/108, 109, 110, 120, 293/132, 136, 155

[56] References Cited

U.S. PATENT DOCUMENTS

| 3,690,710 | 9/1972 | Curran | 293/110 |
|---|---|---|---|
| 3,746,383 | 7/1973 | Davis | 293/71 R |
| 3,854,765 | 12/1974 | Church | 293/136 |
| 3,933,387 | 1/1976 | Salloum | 293/120 |
| 4,029,350 | 6/1977 | Goupy | 293/110 |
| 4,061,384 | 12/1977 | Montgomery | 293/109 |
| 4,072,334 | 2/1978 | Seegmiller | 293/110 |
| 4,105,236 | 8/1978 | Haar | 293/110 |

FOREIGN PATENT DOCUMENTS

| 1221285 | 6/1960 | France | 293/132 |
|---|---|---|---|
| 2166538 | 8/1973 | France | 293/132 |

OTHER PUBLICATIONS

"Theory and Analysis of Flight Structures", by Robert M. Rivello, pp. 44–47.

Primary Examiner—Joseph F. Peters, Jr.
Assistant Examiner—John A. Carroll
Attorney, Agent, or Firm—Oblon, Fisher, Spivak, McClelland & Maier

[57] ABSTRACT

A pseudo-resilient bumper or shield attachment for attaching a bumper or shield to a vehicle is disclosed. The attachment is made up of a vertically extending elastically resilient counter-fitting having one end attached to the chassis of the vehicle and another end to which an inelastically deformable energy absorbing block is attached. The energy absorbing block is attached between the vertically extending counter-fitting and the bumper or shield, and includes collapsible energy absorbing thin walled partitions extending perpendicular to the resilient counter-fitting.

10 Claims, 8 Drawing Figures

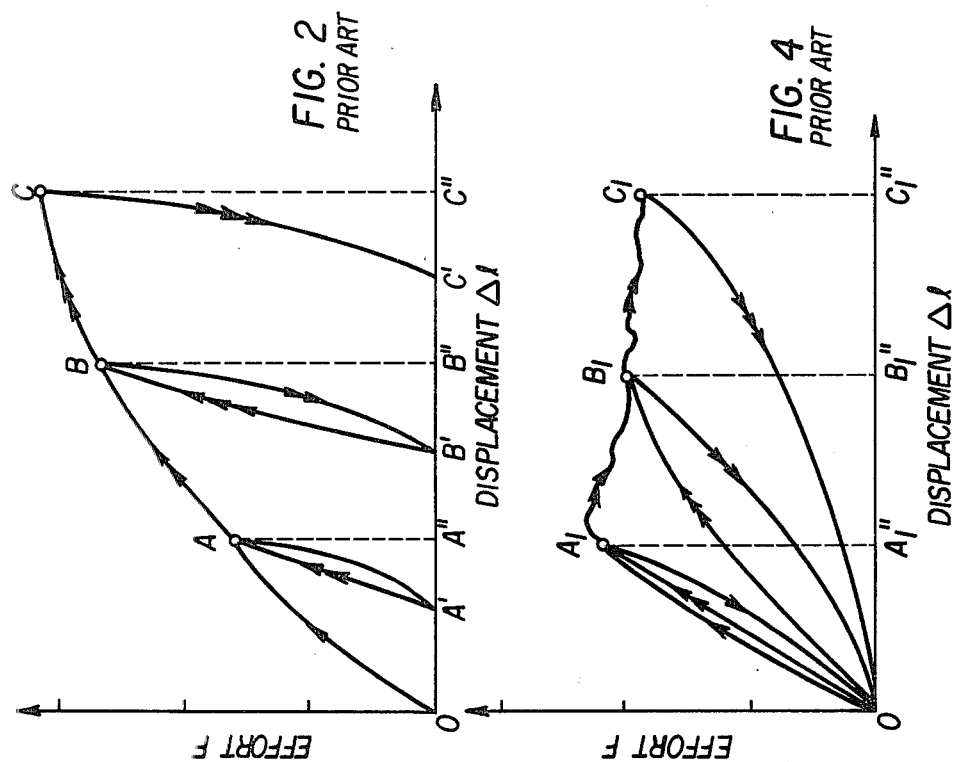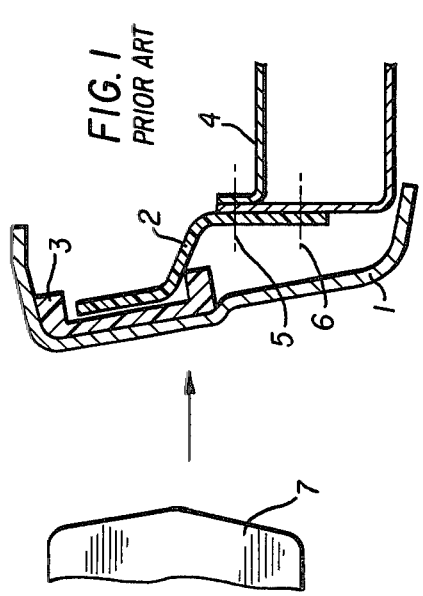

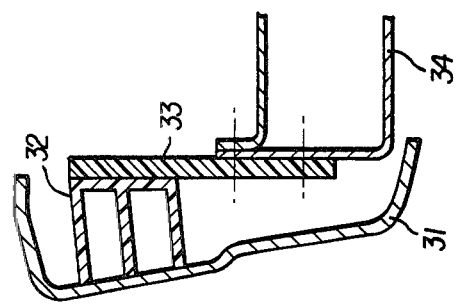
FIG. 7
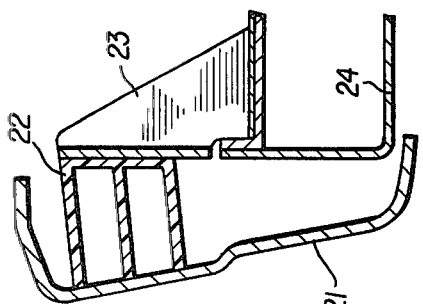
FIG. 5 PRIOR ART
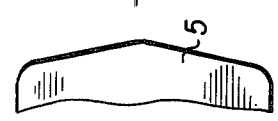
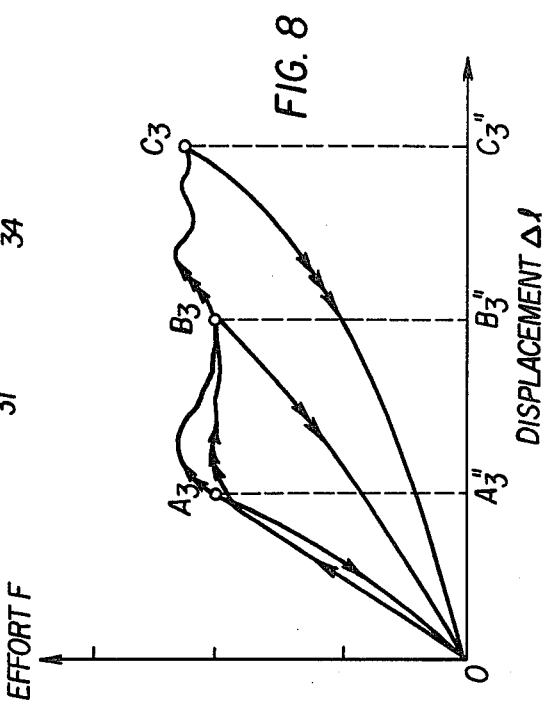
FIG. 8
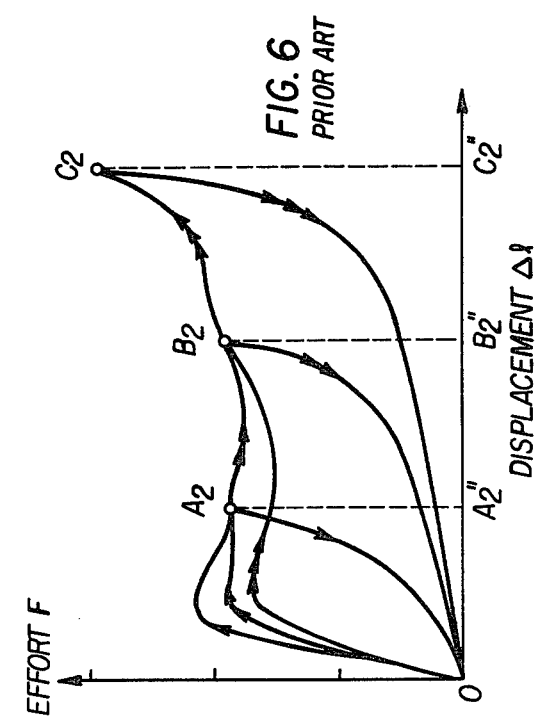
FIG. 6 PRIOR ART

BUMPER ATTACHMENT APPARATUS, IN PARTICULAR FOR AUTOMOBILES

BACKGROUND OF THE INVENTION

Various methods have been suggested for the construction of auto bumpers or shields capable of producing a resilient effect at the moment of collision, so that no permanent damage will be visible.

The present inventors have already proposed, by a different apparatus, to insure the attachment of these bumpers or shields by means of counter-fittings which offer both the property of buckling resiliently and the ability to absorb energy without excessive permanent buckling.

Since bumpers are in general attached near their extremities by counter-fittings, it may be necessary, in certain cases, to provide support fastenings at certain points, in order to avoid excessive travel at the moment of collision.

These fastenings are generally made of sheet metal and require at the point of support a surface that should act as a rubber-covered brake. Because of the way in which they are constructed, the fastenings are susceptible to permanent buckling after a first impact, rendering them relatively inefficient for all later impacts. The object of the present invention is to propose a method for constructing these fastenings which would enable them to absorb a fairly large quantity of energy without undergoing any noticeable permanent buckling.

SUMMARY OF THE INVENTION

To this end the fastenings have been conceived as one or two plastic castings designed in such a way that the thick component unit should be of such a form that the pull of buckling allows it to maintain a resilient or pseudo-resilient reaction, while the thin component unit is provided with a form such that it should react to buckling with a corresponding capacity to absorb energy.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 1, illustrates by vertical section a bumper or shield of synthetic material bound to the vehicle by a regular metal fitting;

FIG. 2 illustrates by way of diagram the stress transmitted to the vehicle in terms of the buckling sustained by the protective ensemble;

FIGS. 3 and 4 illustrate, respectively, the vertical section of an apparatus similar to that in FIG. 1, in which the metal fitting is replaced by a fastening of casted synthetic material, and a diagram of the stress and buckling which result from such an arrangement;

FIGS. 5 and 6 illustrate a vertical section of another energy-absorbing system of the type in FIG. 1, in which the metal fitting is replaced by an absorbing block of thermoplastic material integral with a metal L-bar, and a diagram of the corresponding stress and buckling;

FIGS. 7 and 8 illustrate a vertial section of another system of the type in FIG. 1, according to which the metal fitting is replaced by the combination of a fastening of synthetic material like that in FIG. 3 and an absorber of thermoplastic material like that in FIG. 5, and a diagram of the stresses and restraints that characterize this system.

DETAILED DESCRIPTION OF THE PREFERRED EMBODIMENTS

With reference to FIG. 1, one sees that the bumper 1 is supported against the metal fitting 2 which requires a rubber brake 3 and is fixed to the structure of the car by pins or welding 5 and 6. The entire system can be subjected to successive stresses of compression with the use of a punch 7, in such a way that one imposes a series of bucklings under applied stresses.

In the stress-buckling diagram in FIG. 2 it can be seen that, corresponding to each application of compressive force, an increasing and cumulative permanent buckling results, the diagrams which describe the applications and releasings of stress being successively $OAA'$-$A'ABB'$-$B'BCC'$, which correspond to the buckling resulting from applied forces $A''$, $B''$, $C''$. It can be noted thus that with each new impact, the stress transmitted to the vehicle becomes greater and that, elsewhere, the support fastenings undergo permanent buckling which moves them progressively farther from their original position. This arrangement is modified in FIG. 3 by substituting for the fastening 2 and the rubber brake 3 a molded plastic counter-fitting 12 attached by pins 13 and 14. Three successive compressions are applied with the punch 15 to impose the same buckling under stress. The counter-fitting 12 is a plastic casting, either of thermoplastics such as polyamides, polyoxymethylenes, or polyolefins, for example, or of thermosettings such as polyesters or epoxydes preferably reinforced with fiberglass. At the first application of stress with bucklings such as $OA''_1$, not exceeding the limit of resiliency, the counter-fitting can sustain a large number of impacts without apparent damage. With a greater travel $OB''_1$, the plastic fastening buckles resiliently but undergoes the beginnings of alteration (beginnings of flattening in the case of fiberglass reinforced material, crystalline decohesion in the case of thermoplastics) such that in the buckling next imposed in $OC''_1$, a noticeable drop in the corresponding reaction force takes place (see diagram in FIG. 4).

According to the arrangement in FIG. 5, the bumper 21 is supported by an absorbing block of casted thermoplastic material 22 (such as polyolefines, polyamides, etc.) integral with a perfectly rigid metal L-bar 23, itself integral with the body of the vehicle 24. The punch 5 applies successive stresses to effect the same bucklings under imposed stresses.

The diagram in FIG. 6 corresponds to the absorbing blocks 22 of cast thermoplastic, which are in the form of thin-walled boxes whose partitions are collapsible and perceptively perpendicular to the resilient counter-fitting and to the bumper.

With successive applied bucklings its reaction is rather resilient with a relatively constant stress but, after a certain amount of collapse, a noticeable increase occurs in the stress transmitted to the vehicle.

The apparatus, according to the present invention, is represented in FIG. 7.

The piece which attaches the bumper 31 to the reinforced structure 34 of the vehicle's body is a pseudo-resilient support fastening capable of absorbing energy, comprised of the combination of a resilient vertical fitting 33 analogous to that in FIG. 3, functioning by means of bending and of which one end is attached to the chassis and the other to an energy-absorbing block 32 analogous to that in FIG. 5, whose functioning lies in its collapsing partitions and which is in contact with the bumper or shield.

The diagram of this apparatus characteristics (stress in terms of displacement) gives evidence to its advantages in FIG. 8.

For the first imposed buckling $OA''_3$, the diagram $OA_3$ corresponds in practice to the resilient bend of the counterfitting 33, if the absorber 32 has been properly secured.

Next, points $B_3$ and $C_3$ are described by a combination of diagram FIGS. 4 and 6, but one will note that toward zone $C_3$ the stress remains more or less constant because of the opposing tendencies of the thick resilient component (decrease in stress) and the thin absorbing component (increase in stress).

The resilient component, the counter-fitting 33 can be made of thermosetting material reinforced with fiberglass or of thermoplastic material made rigid by ribbings and a suitably adapted form. Its general thickness may vary from 2 to 8 mm.

The thin component absorbing energy, the block 32, is made of thermoplastic material and its thickness at its partitions is in the area of 0.5 to 2 mm.

This system may be made up of only one unit or by the assembling of two units molded separately whose ratio of respective thickness would be about 4:1 and may, according to particular need, vary from 2:1 to 10:1.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A pseudo-resilient bumper or shield attachment comprising:
   a vertically extending elastically resilient cantilever counter-fitting having one end attached to the chassis of a vehicle and having another end; and
   an inelastically deformable energy absorbing block having collapsible partitions, said block being in contact between said other end and said bumper or shield,
   wherein said block comprises a box having thin walled partitions, said partitions extending perpendicular to said resilient counter-fitting.

2. The apparatus of claim 1 wherein said resilient counter-fitting is composed of one of the thermoplastic materials from the group consisting of polymides, polyoxymethylenes and polyolefines.

3. The apparatus of claim 1 wherein said resilient counter-fitting is composed of one of the thermoplastic materials from the group consisting of fiberglass reinforced polyesters and fiberglass reinforced epoxydes.

4. The apparatus of claim 1 wherein said block is composed of a cast thermoplastic material from the group consisting of polymides and polyolefines.

5. The apparatus of claims 1 or 2 wherein the thickness of said counter-fitting is between 2 mm and 8 mm.

6. The apparatus of claim 1 or 4 wherein the thickness of said partitions is between 0.5 mm and 2 mm.

7. The apparatus of claim 1 wherein said counter-fitting and said block are an integral unit.

8. The apparatus of claim 1 wherein said counter-fitting and said block are formed as separate units.

9. The apparatus of claim 1 wherein the ratio of the thickness of said counter-fitting to the said block is between 2:1 and 10:1.

10. The apparatus of claim 1 wherein the ratio of the thickness of said counter-fitting to the walls of said block is 4:1.

* * * * *